Patented Aug. 13, 1929.

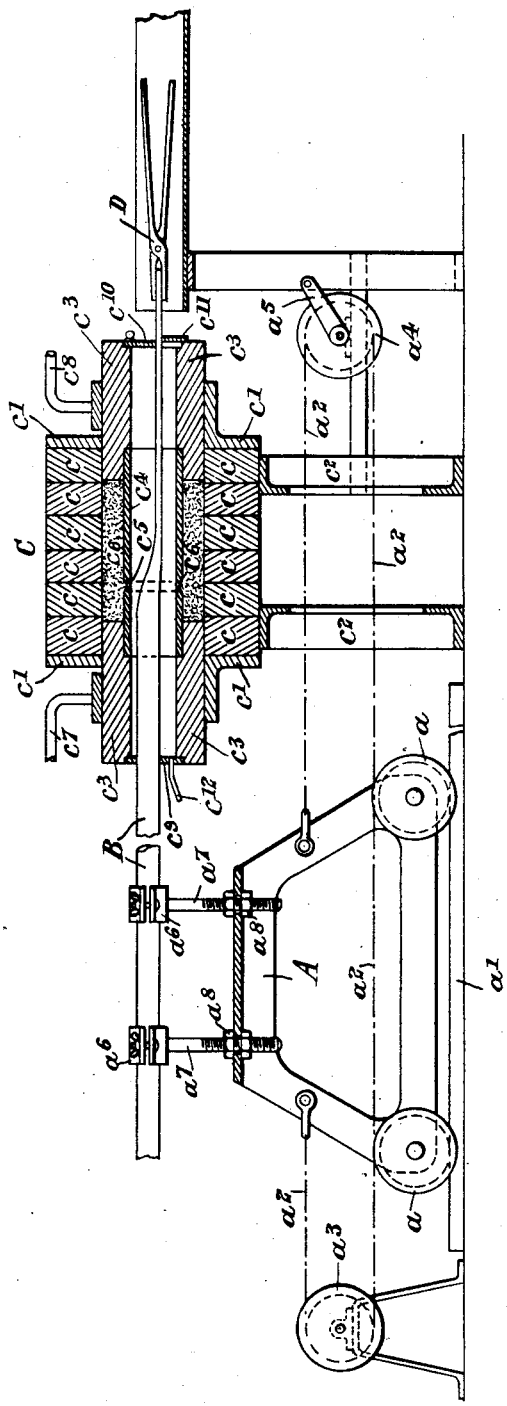

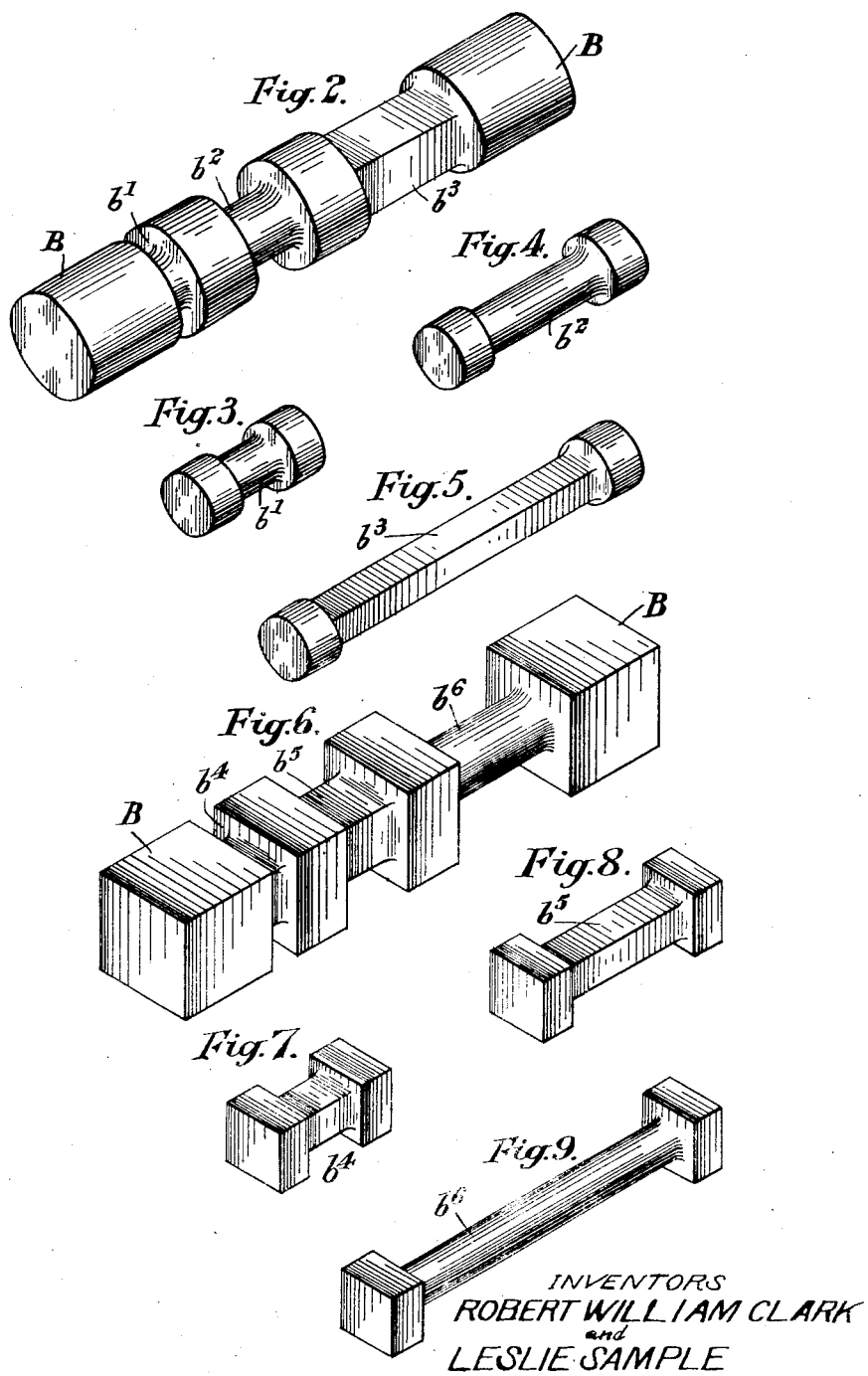

1,724,793

UNITED STATES PATENT OFFICE.

ROBERT WILLIAM CLARK, OF NEWCASTLE-ON-TYNE, AND LESLIE SAMPLE, OF NORTH-UMBERLAND, ENGLAND, ASSIGNORS TO THE THERMAL SYNDICATE LIMITED, OF WALLSEND-ON-TYNE, ENGLAND.

MANUFACTURE OF FUSED QUARTZ BEAMS OR THE LIKE.

Application filed August 31, 1925, Serial No. 53,684, and in Great Britain January 14, 1925.

This invention has for its object the production of beams, rods, strips or the like, of any desired section, solid or hollow, in fused quartz, or silica, or other vitreous material having the requisite physical characteristics as hereinafter explained.

The beams made by this process may, for example, be of rectangular, cruciform H, T, or L section or of fluted, or other required section, and either solid or hollow, their sectional dimensions and length being limited only by the mass of the initial fusions from which they are produced.

It is well known that fused silica when heated becomes plastic and can be drawn out, similarly to glass at a lower temperature. In particular it is known that rods, or tubes, of fused silica can be drawn out into longer rods, or tubes, of proportionately reduced cross-section by heating them to plasticity in a tubular furnace and drawing the rod, or tube from inside the furnace.

We have found that, by a considerable modification of this procedure it is possible to produce relatively long beam-like products of any desired cross-section and of uniform gauge over considerable lengths without the use of any external die, or draw-plate and that it is also possible to produce beam-like products of any length having cross-sections which can be varied considerably as desired throughout the length of the said beam-like products.

In carrying out the invention we first produce an ingot having the required cross-section to a greatly enlarged scale but of proportionately reduced length.

The ingot may be formed, for example, either from a hollow approximately cylindrical mass of fused silica, such as can be produced by the process of silica fusion described in the specification of British Letters Patent No. 18437 of 1904, or it may be produced from a hollow, or from a solid, cylindrical plastic mass formed by fusion of silica inside an electrically heated ttubular furnace, or the ingot may be produced by any other suitable means.

In the case of the initially hollow mass, this may be converted into a solid ingot by the application of external pressure so as to close and weld up the central tubular space, the pressure being applied by suitably shaped blocks, or pressure-applying devices, or by passing the plastic mass between suitably shaped power-driven rollers, or by evacuating the hollow mass so as to utilize external atmospheric, or other gaseous pressure, or by any combination of such means.

When a tubular cross-section is required, the interior configuration may be secured by introducing a mandrel, or core, of graphite, metal, or other refractory material, inside, the tubular space throughout the fusion prior to the application of external pressure.

In the case of an initially solid plastic mass for the production of solid sections, a similar procedure is adopted the plastic mass being pressed, or rolled, to a section similar (but on an enlarged scale,) to that required for the final product. In certain cases the required cross-section of the ingot may be obtained by introducng suitable refractory moulding pieces, for example, of carbon, or graphite, into the furnace itself so as to modify the cross-section of the fusion.

In cases where it is desired to produce a length, or lengths, of a uniform cross-section, or sections, but which shall increase at the ends, or at other parts of the length to thicker cross-sections, this result may be obtained by shaping, or notching, an initially solid, or hollow, fusion, mass, or ingot to the shape, or section, desired for the portion of the product between the thicker portions, while the thicker portion, or portions, may also be varied in cross-sectional shape in a similar manner if desired.

In cases where accurate moulding, or particularly smooth surfaces are required in the final product, the shaped ingot is allowed to cool and is finished, for example, by grinding to the exact configuration and smoothness of surface required.

By this process tubes for example, can be produced with an external surface greatly superior to that of tubes drawn direct from a fusion or produced by the drawing down of ordinary tubing of large diameter.

For this purpose a tubular ingot is first formed as already described and its surface is then finished by grinding, or by fine glazing by means of the oxy-hydrogen or other torch, the electric arc, or the like. The finished ingot is then re-heated and drawn as hereinafter described.

In this way it is also possible to produce thick walled tubing such as has not hitherto been producible by the ordinary methods of tube-drawing.

The second stage of the process relates to the drawing down of the shaped ingot so as to produce beam-like lengths of similar cross-sectional form to that of the ingot, but on a reduced scale.

The apparatus for this purpose consists of a special design of tubular furnace adapted to radiate heat completely around the ingot and capable of providing the requisite temperature adjustment. This tubular furnace provides a preheating zone by which the ingot is brought just below the softening stage, a highly localized drawing temperature zone, and a relatively long lower temperature post-heating zone to maintain the constant thermal condition of the drawing out end to prevent strain in the drawn product. The said furnace consists preferably of a heat-insulated tubular structure of which the central portion is a heating element, preferably an electrically heated tube, or the equivalent.

Alternatively the heating element may consist of a known equivalent of an electrically heated tube such for example as a ring or series of coaxial rings of inwardly directed oxyhydrogen or oxyacetylene jets.

This heating element is preferably so designed (by suitably grading the electrical resistance of the element or the heating power of the jets) that the maximum temperature is developed over a relatively narrow belt, or zone of the heating element, which belt, or zone, may be situated for example at a distance equal to one-fifth of the length from the end of the heating element through which the ingot is fed. In the case of an electrically heated element (which is preferred) the heat-grading may be effected by varying the effective cross-section or the electrical resistance of the element or in any other convenient way and the maximum temperature may be adjusted by the regulation of the heating current in the usual way.

For example, a furnace for drawing small sections may consist of a carbon tube 18 inches long, 4 inches bore by half an inch thickness of wall.

The maximum heating zone may be produced either by reducing the wall thickness or by drilling holes in rows round the tube.

Such a furnace may need 3,000 amperes at 16 to 17 volts, that is to say about 50 kilo watts to produce the required working temperature of about 2200° centigrade maximum.

Although the process as described herein applies to a furnace in which the axis of the heating tube is horizontal, the process may also be carried out with the axis of the heating tube inclined at an angle, or vertically disposed if it be suitably modified.

In the case of an electrically heated element it is desirable to provide means for preventing as far as possible ingress of air to the furnace in order to prevent burning away of the heater tube. This can be done either by the provision of suitable baffle plates or by introducing an inert gas into the furnace.

In carrying out the process of drawing down, the shaped ingot is introduced eccentrically (as viewed in cross-section) into the back end of the tubular furnace, being suitably anchored at one end, but so as to be capable of being fed gradually forward towards the high temperature zone. The other end of the ingot lying immediately beyond the highly heated zone is gripped by tongs, for instance, and, as soon as the requisite degree of plasticity has been reached, is drawn out through the front end of the furnace. The tension to be applied to the heated ingot for drawing it depends on the size of the ingot, the rate of heating and the rate of feeding in.

We have found by experiment that by regulating the temperature of the heating element so as to maintain the ingot as a whole below the bending temperature and by progressively feeding the ingot forward so as to maintain the cross-sectional dimensions of the more highly heated portion of the ingot lying in the heated belt or zone, it is possible to maintain the ingot in such a condition that the drawing out can be continuously carried on without any distortion of the cross-section or any rounding of external angles of the drawn mass.

It is desirable that in the case of a horizontal furnace the heated end-portion of the ingot shall be supported in such manner that the axis thereof is above the centre line of the tubular furnace.

Figure 1 of the accompanying drawings illustrates, in section, one type of apparatus suitable for carrying out the process of drawing down the shaped ingot in accordance with this invention, the said apparatus comprising a carriage A for supporting the shaped ingot B, a tubular electric furnace C into which the said ingot is fed gradually and tongs D for gripping and drawing down and withdrawing through the outlet of the said furnace the end of the ingot lying immediately beyond the highly heated zone of the furnace when the requisite degree of plasticity of the said end has been reached.

The carriage A is mounted on wheels $a$ running on rails $a^1$ and can be traversed in either direction by a chain $a^2$ secured to the said carriage and passing round sprocket wheels $a^3$ and $a^4$ the shafts of which are rotatably mounted in bearings on any suitable standard or stationary part of the apparatus. The shaft of the sprocket wheel $a^4$ is shewn provided with a hand-lever $a^5$ for rotating it. The shaped ingot B is held on the carriage A by clamps $a^6$ one member of each of which is secured to a screw-threaded spindle $a^7$ passing through a hole in the frame of the said carriage to which it is adjustably secured by nuts $a^8$ threaded on the said spindle so that the said ingot can be raised or lowered as required.

The electric furnace C shewn consists of a hollow body-part $c$ of firebrick held between side frames $c^1$ and supported on standards $c^2$. Fitting within and projecting from the ends of the hollow body-part $c$ are tubular electrodes $c^3$ having between them and centrally arranged with respect to the said body-part a carbon tube $c^4$ constituting the heating element of the said furnace, and through which the said shaped ingot is fed. The wall thickness of the carbon tube $c^4$ is reduced at $c^5$ whereby the electrical resistance is caused to be greater at this part so that the maximum temperature is developed over a relatively narrow belt, or zone. The annular space $c^6$ between the carbon tube $c^4$ and the hollow body-part $c$ is preferably filled with carbon granules. $c^7$ and $c^8$ indicate the electric power leads.

In order to prevent burning away of the tube $c^4$ ingress of air to the furnace is prevented as far as possible and an inert gas may be introduced therein. This is shewn as being effected by a closure plate $c^9$ at the entrance of the said furnace, the said plate having an aperture therein conforming as far as practicable to the outer shape and dimension of the shaped ingot to be fed therethrough and by a removable closure plate $c^{10}$ at the outlet of the said furnace having a slot therein for the passage of the drawn down product the lower part of the said slot being closed by an auxiliary plate $c^{11}$. Inert gas may be introduced at the entrance of the furnace by a pipe $c^{12}$ connected to any suitable source of supply.

Figure 2 illustrates an ingot before it is passed through the furnace, mainly of circular cross section from which beam-like products are obtained according to this invention, the said ingots being suitably notched as at $b^1$ and shaped circular in cross section as at $b^2$ and square in cross-section as at $b^3$. After its introduction and heating in the furnace in the manner already described it is drawn out to produce when cut, sections similar to those of the original ingot but elongated and proportionately reduced, thus Figure 3 shews the part $b^1$ of Figure 2, Figure 4 the part $b^2$ of Figure 2, and Figure 5 the part $b^3$ of Figure 2. Figure 6 in like manner shews an ingot B before its passage through the furnace, notched and shaped as already described with reference to Figure 2, but in this case the ingot is mainly square in cross-section. Figures 7, 8 and 9 shew the ingot elongated into a beam, or the like, after being subjected to the heating in the furnace, the corresponding parts $b^4$, $b^5$, $b^6$ being correspondingly lettered in the Figures 6, 7, 8 and 9.

In Figures 3, 4 and 5; and in Figures 7, 8 and 9 an elongated beam is shewn cut into separate sections but it will be understood that the said elongated beam need not be so divided, for example, a large number of similar pieces can be produced from the same fused ingot without cutting when it is desired to produce strain insulators in one piece.

The novel effect of accurate scale reduction by free drawing as aforesaid appears to depend on the fact that, under the proper conditions of temperature control, and rate of feeding, the mass becomes sufficiently plastic when progressively heated to enable it to be drawn down while the surface tension is so low in relation to the degree of plasticity produced as not to have any appreciable effect in rounding off, or distorting, the external forms of the heated mass. If the application of the drawing down temperature is prolonged through excessive temperature, or insufficient speed of feeding, the cross-section will be deformed.

In cases where a high degree of surface-finish is not required so that grinding, or other finishing of the ingot is not necessary, the original fused mass may be pressed into shape and transferred while still hot, to the drawing down furnace so as to economize the heating requisite in the drawing down process.

Throughout the specification and claims the word "beam", referring to the product, has been used as meaning and including not only a beam but also a rod, strip, or the like, whether solid or hollow.

We claim:

1. A process for producing beams from a mass of fused silica, comprising converting the mass into an ingot having the required cross-section on an enlarged scale and a length on a proportionately reduced scale, passing said ingot in eccentric alignment progressively through a surrounding preheating zone to bring it to a temperature just below the softening stage, passing the ingot through a surrounding highly localized maximum temperature zone to give it the required degree of plasticity, and drawing the beam out eccentrically through a relatively long post heating zone at a lower temperature.

2. A process for producing beams from a mass of fused silica, comprising converting the mass into an ingot having the required cross-section on an enlarged scale and a length on a proportionately reduced scale, passing said ingot in eccentric alignment progressively through a surrounding preheating zone to bring it to a temperature just below the softening stage, passing the ingot through a surrounding highly localized maximum temperature zone to give it the required degree of plasticity, and drawing the beam out eccentrically through a relatively long post heating zone at a lower temperature, the eccentric alignment of the ingot being above the axis of the surrounding preheating zone, and that of the beam being below that of the post heating zone, substantially as described.

3. A process for producing beams from a mass of fused silica, comprising converting the mass into an ingot having the required cross-section on an enlarged scale and a length on a proportionately reduced scale, passing said ingot progressively through a surrounding preheating zone to bring it to a temperature just below the softening stage, passing the ingot through a surrounding highly localized maximum temperature zone to give it the required degree of plasticity, and drawing the beam out through a relatively long post heating zone at a lower temperature, the surrounding preheating, maximum temperature, and post heating zones enclosing an inert gas.

4. Apparatus for use in drawing out shaped ingots of fused silica or the like, comprising a tubular furnace, means external to said furnace for supporting an ingot and for feeding it eccentrically into said furnace, and means eccentric both to the ingot and to the furnace for drawing down the end of the ingot lying immediately beyond a highly heated zone of the furnace, substantially as described.

In testimony whereof we have signed our names to this specification.

ROBERT WILLIAM CLARK.
LESLIE SAMPLE.